United States Patent [19]

Kranabetter

[11] Patent Number: 4,768,111
[45] Date of Patent: Aug. 30, 1988

[54] CIRCUIT ARRANGEMENT FOR SHAPING AN ANALOG READ OUTPUT SIGNAL IN A ROTATING MASS MEMORY

[75] Inventor: Johann Kranabetter, Rosenheim, Fed. Rep. of Germany

[73] Assignee: Siemens Aktiengesellschaft, Berlin and Munich, Fed. Rep. of Germany

[21] Appl. No.: 891,941

[22] Filed: Aug. 1, 1986

[30] Foreign Application Priority Data

Aug. 20, 1985 [DE] Fed. Rep. of Germany ....... 3529797

[51] Int. Cl.$^4$ .............................................. G11B 15/12
[52] U.S. Cl. ......................................... 360/62; 360/61
[58] Field of Search ......................... 360/62, 61, 67, 46

[56] References Cited

U.S. PATENT DOCUMENTS 4,203,139 5/1980 Horiuchi ............................... 360/62

Primary Examiner—Vincent P. Canney
Attorney, Agent, or Firm—Hill, Van Santen, Steadman & Simpson

[57] ABSTRACT

In rotating mass memories, for example magnetic disk memories, write or, respectively, read operations are controlled by a static status signal. A plurality of read heads having assigned preamplifiers is selectively activatable with the assistance of a selection signal and is through-connectible to a common signal shaping device for further amplification and filtering of the read output signal. The signal shaping device has an input stage assigned thereto in which the differential outputs of the preamplifiers are respectively connected in parallel to the signal shaping device via a respective coupling capacitor. The input stage also comprises first analog switches arranged between an operating voltage and the coupling capacitors and comprises second analog switches in series in the signal lines. Derived from the signal state of the status signal, these are controlled such that the coupling capacitors are quickly recharged by brief activation of the first analog switches given a status change and the signal lines are only switched through thereafter by closing of the second analog switches.

7 Claims, 2 Drawing Sheets

CIRCUIT ARRANGEMENT FOR SHAPING AN ANALOG READ OUTPUT SIGNAL IN A ROTATING MASS MEMORY

BACKGROUND OF THE INVENTION

1. Field of the Invention

The present invention relates to a circuit arrangement for shaping an analog read output signal in a rotating mass memory in which write or, respectively, read events are established by a static state signal and a plurality of read heads having assigned preamplifiers is selectively activated with the assistance of a selection signal and is through-connected to a common signal shaping device for further amplification and filtering of the read output signal.

2. Description of the Prior Art

An example of such mass memories is the magnetic disk memory in which a plurality of storage disks are united to form a disk pack arranged in common on a disk drive. The disk pack is motor driven via a disk drive motor having a nominal speed. Combined read/write heads are usually respectively assigned to the active surfaces of the storage disks, these combined read/write heads being moved radially relative to the disk pack by a positioning device for track selection and the positioning device being fashioned as a linear positioner or as a rotary positioner.

In the present state of the art, what is referred to as a head electronics is usually directly three-dimensionally assigned to the individual read/write heads, the head electronics being composed, among other things, of a preamplifier for the read channel or, respectively, of an amplifier output stage for the write channel. In addition to containing actual data disks for the storage of data information, the disk pack can also contain what is referred to as a servo disk on which the servo information for controlling the track setting events for all read/write heads are permanently stored in common. In such a case, a servo head which cooperates with the servo disk is provided in addition to the read/write heads which are assigned to the data disks. As a consequence of the interface conditions which have often already crystallized as a standard for magnetic disk memories and which define a relatively low data transmission rate, it is standard in magnetic disk memories to respectively selectively activate only one of the systems composed of a data disk and a head unit in read or, respectively, write operations. This selection occurs via a common control device which supplies the head electronics of the system to be selected with a corresponding selection signal for activation. This control device is also used to set the corresponding operating state "read" or, respectively, "write" in the disk storage device. To this end, it generates a corresponding static status signal wherein respectively one level is assigned to one of these operating states. In particular, the read and write channels are opened or, respectively, blocked alternatively by way of the status signal.

Given these conditions, it is standard to connect the head of the electronics of the individual data heads in parallel with respect to the read channels or, respectively, write channels and, in particular, to connect the read channels in common to an evaluation circuit which first edits the read and preamplified read output signal, i.e. further amplifies and filters the signal, then digitizes the same and, finally, decodes the signal for the recovery of the binary data signals. In practice, the circuit arrangement for shaping the preamplified analog read output signal contains a controllable differential amplifier as a first signal shaping stage, for which reason the preamplified analog read output signal is likewise supplied to this stage as a difference signal and is usually coupled in via coupling capacitors. The output stages of the preamplifiers of the respective head electronics are, therefore, fashioned as symmetrical amplifiers; they can be emitter followers or they can also be output stages having an open collector. Particularly in the latter case, the two differential signal inputs of the signal shaping device are respectively applied to operating voltage via collector resistors shared by all head electronics.

Systematically conditioned, the signal shaping device with its units such as the controllable differential amplifier and the filter network comprises certain time constants which are required in order to avoid distortions in the analog read output signal. Particularly crucial here are the filter time constants which lie on the order of 30–50 $\mu s$ given high performance disk storage devices. On the other hand, however, voltage peaks occur at the differential signal inputs of the signal shaping device in switch-over operations, i.e. when switching from the operating state "write" into the operating state "read", this being true both with these voltage peaks effective transient of a considerable chronological length which, given an operating mode of the disk memory having a frequent change from the write state into the read state, and vice versa, leads to a deteriorating performance reduction of the device in the form of relatively long access times.

SUMMARY OF THE INVENTION

It is therefore the object of the present invention to provide a circuit arrangement of the type originally set forth in which, despite the systematically conditioned time constants in the signal shaping device, a favorable transient behavior is achieved given switch-over events and, therefore, a shortening of these events is achieved.

The above object is achieved, according to the present invention, in a circuit arrangement of the type set forth above which is particularly characterized in that the signal shaping device has an input stage assigned thereto in which respectively one input of the preamplifiers is connected to the signal shaping device in parallel via a coupling capacitor and in which, furthermore, a first analog switch is arranged between an operating voltage and the coupling capacitor and a second analog switch is connected in series in the line train, these being controlled in accordance with the signal state of the status signal such that, given a status change, a coupling capacitor is quickly recharged by brief activation of the first analog switch and the line train is through-connected by closing the second analog switch subsequently thereto. This solution is based on the fact that the static state control signal which defines the present operating state of the disk storage memory is usually present anyway. In this control signal, it is predominantly the static level which is usually the essential criterion. In the present case, however, it is particularly the appearance of signal edges in this control signal which are additionally evaluated in a function-defined manner. The appearance of a signal edge, of course, means that a switch-over event from one operating state into the other operating state is now occurring in combination with such a critical transient. The appearance of such signal edge can therefore be employed to separate the activated output stage of the preamplifier and the function units of the signal editing device from one another during the switch-over operation, but also during the write events and to undertake measures in order to have the inherently unavoidable transients decay quickly. The second analog switch serially inserted into the signal line thereby assumes the function of separating the signal path, whereas the first analog switch serves the purpose of quickly reloading the assigned coupling capacitor during the interruption of the signal path.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
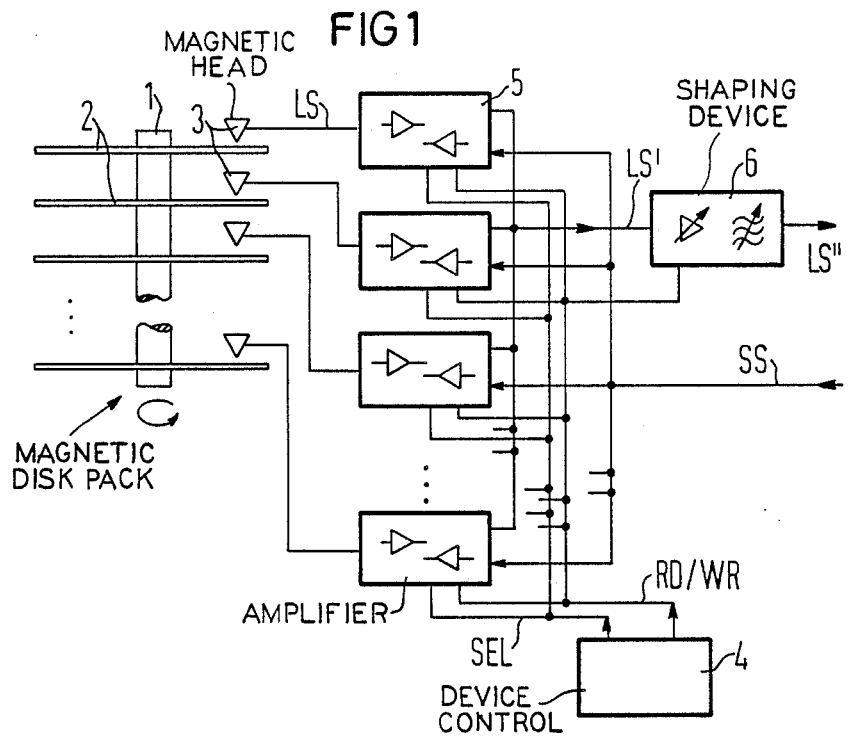
FIG. 1 is a block circuit diagram of the write/read electronics of a magnetic disk memory comprising preamplifiers assigned to the magnetic heads and comprising a shared signal editing device.

Referring to FIG. 1, the known structure of a write/read electronics for a magnetic disk memory is schematically illustrated. A disk pack is illustrated which comprises a series of magnetic disks 2 equidistantly arranged on a disk pack hub 1. In the schematic illustration of FIG. 1, it is merely indicated by an arrow that the disk pack is rotationally moved with a defined nominal speed for writing or reading information in order to obtain the required relative speed between radially positionable magnetic heads 3 and the respective active surface of the corresponding magnetic disks 2. For each write/read operation, a data track is selected by radial displacement of the magnetic heads 3 on the magnetic disks 2 and this track position is maintained by a positioning system (not shown).

One of the magnetic disks 2 is usually selected in such an operation in the magnetic disk memory. To this end, a device control 4 generates a selection signal SEL which respectively activates only the head electronics assigned to the selected storage disk 2 which is connected to the corresponding magnetic head 3. In FIG. 1, the head electronics is schematically indicated in the form of amplifier circuits 5 which represent a preamplifier with respect to an analog read output signal LS received from the assigned magnetic head 3 or, respectively, represent an amplifier output stage with respect to a write signal SS to be transmitted to the magnetic head 3.

Whereas the head electronics is provided respectively once per magnetic head 3, the following devices for processing preamplified read output signal LS' are only provided once. The amplifier circuits 5 are therefore connected in parallel with respect to their outputs for the read output signal channel and are connected in common to the input of a signal shaping device 6 which is essentially composed of a controllable amplifier and of corresponding filter stages, as schematically illustrated in FIG. 1. A preamplified and filtered read output signal LS" is output at the output of the signal shaping device and is supplied in a known manner to further circuits which are not illustrated here and which derive a digital signal from the analog signal which, finally, is decoded to form a binary signal in accordance with the selected recording method.

In the reverse manner, the input of the amplifier circuits 5 assigned to the write signal channel are supplied with the digital write signal SS, for example, being supplied therewith from a controller (not shown) of the magnetic disk memory. This digital write signal is further amplified in one of the selected activated amplifier circuits in order to generate a magnetic flux change corresponding to the write signal on the surface of one of the storage disks by the cooperation of the connected magnetic head 3 and the assigned surface of the storage disk 2.

The structure of the write/read electronic of a magnetic disk memory which has been set forth above is known per se and has therefore only been set forth in a brief summary here. The described arrangement allows one of the storage disks 2 to be selectively employed for a defined write or read operation and allows data recorded to be read or, respectively, allows data to be written into the selected track. This is effected with the assistance of the selection signals SEL output by the control 4 which activate the corresponding amplifier circuit 5. The respective operating state "write" or "read" is set by a static status control signal RD/WR.

In a read operation, for example, only the corresponding output stage of a read output signal amplifier of the selected amplifier circuit 5 is then switched on. Upon transition from the write status into the read status, this turn-on then elicits a discontinuous signal change which effects a transient in the connected signal editing device 6 as a voltage surge. This device contains circuits such as controllable amplifiers and filter stages which comprise relatively great time constants which are system conditioned. Since critical distortions would otherwise occur when processing the preamplified read output signal LS', given a direct coupling-in of the preamplified read output signal LS' into the signal editing device 6, these time constants, in turn, cause a long response time which is undesirable in view of the desire for a short access time of the magnetic disk memory. Measures must therefore be undertaken in order to optimize the transient response of the signal editing device despite the system-conditioned, great time constants of this circuit arrangement.

Figure 2:
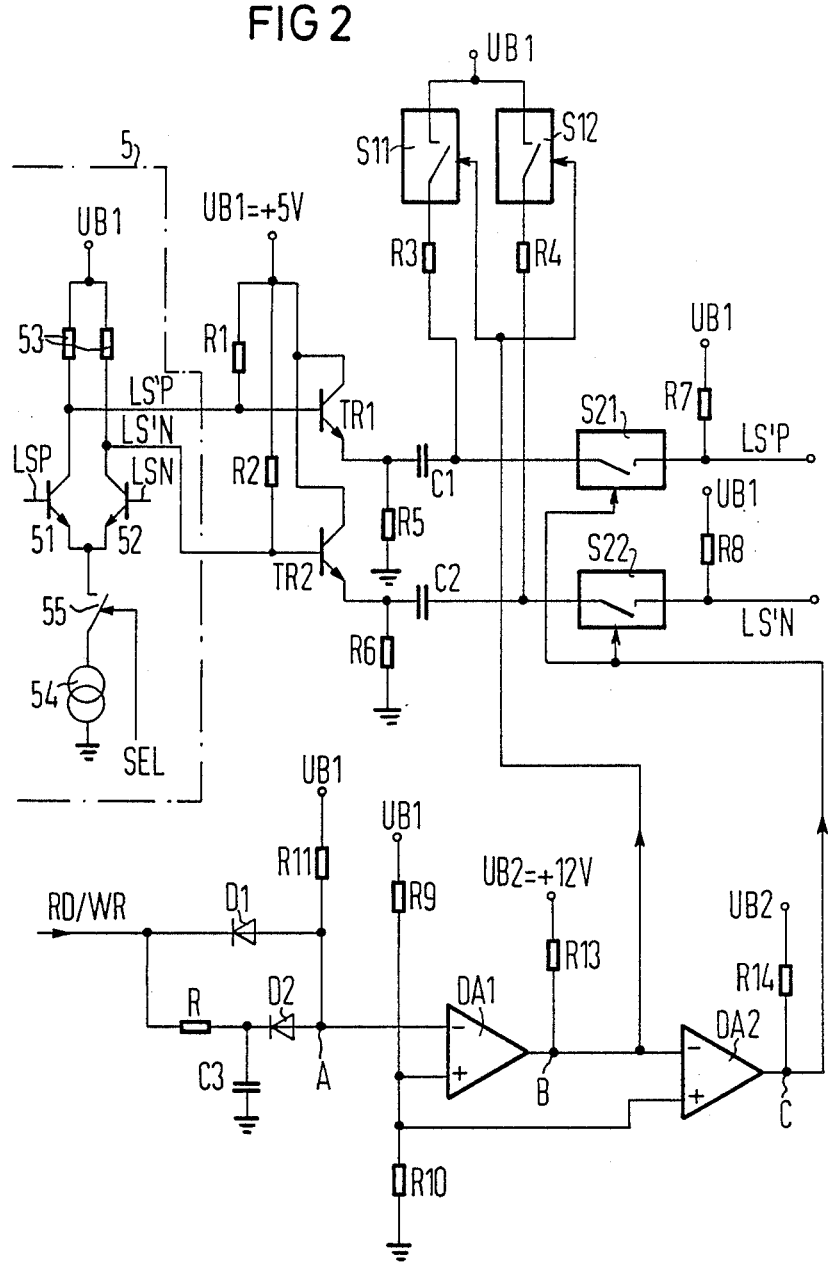
FIG. 2 is a circuit diagram of the switching network defining the transient behavior as an input stage to the signal shaping device.

FIG. 2 is a schematic circuit diagram of an input stage of the signal shaping device 6 with which the transient response of the signal shaping device is significantly improved in comparison to conventional, direct in-coupling of the preamplified read output signal LS'. In order to better illustrate the relationship to the block circuit diagram of FIG. 1, an output stage for the preamplified read output signal LS' of one of the amplifier circuits 5 is illustrated on the left. This output stage is constructed here as what is referred to as an "open collector" circuit. Two emitter-coupled output stage transistors 51 and 52 are provided, their bases being respectively supplied with the positive or, respectively, negative sub-signals LSP or, respectively, LSN of the read output signal LS. The collectors of these output stage transistors are coupled via respective charging resistors 53 to a common, positive supply voltage UB1 which should amount to +5 V. The collector terminals of the two output stage transistors form the respective outputs for the positive or, respectively, negative sub-signals LS'P or, respectively, LS'N of the preamplified read output signal LS'.

In order to select one such output stage in one of the amplifier circuits 5, a current source 54, which is connected via a switch 55 to both emitters of the output stage transistors 51 and 52, is provided. The switch 55 is switched via the corresponding selection signal SEL output by the device control 4 and is closed in the activated state of the read output signal amplifier in the selected amplifier circuit 5.

The "open collector" circuit enables the parallel connection of a plurality of read output signal amplifiers or, respectively, amplifier circuits 5 as illustrated in FIG. 1. The circuit arrangement of FIG. 2, however, also shows that an in-phase shift and an offset current drift unavoidably occur upon every connection of the current source 54 due to the unavoidable differences of the transistor parameters of the output stage transistors 51, 52. By way of simplification, FIG. 2 shows only a single output stage of one of the amplifier circuits 5. In fact, however, as derives from the block circuit diagram of FIG. 1, a plurality of such output stages are connected in parallel with respect to their outputs.

In order to then govern the voltage surge appearing in the signal shaping device 6 at each switching of the output stage of an amplifier circuit 5 the short transient response, the signal shaping device 6 comprises an input stage which is realized with that portion of the circuit arrangement illustrated in FIG. 2 which has not yet been described. This input stage, which shall be referred to as a transient circuit, allows the actual signal editing device 6, i.e. the controllable amplifier with the following filters, and the amplifier circuits 5 to be separated from one another during the switch-over operations from the write state into the read state and vice-versa, and also allows them to be separated from one another during the overall write operation.

The transient circuit first comprises respective resistors R1 and R2 assigned to the two signal paths for the sub-signals LS'P and LS'N of the amplified read output signal LS', these resistors being connected in common to the supply voltage UB1 and forming the collector resistors for all output stages of the amplifier circuits. Moreover, each of the two input lines carrying the sub-signals LS'P and LS'N of the preamplified read output signal LS' is connected to the respective base of a switching transistor TR1 or, respectively, TR2 whose emitters, connected to ground via respective emitter resistors R5 and R6, are each further connected to a serially-arranged coupling capacitor C1 or, respectively, C2. In a switch-over event, for example when switching from a write state into a read state, the coupling capacitors must be quickly charged to the new value conditioned by the discontinuity of the input voltage. For this purpose, first analog switches S11 or, respectively, S12 connected to the positive operating voltage UB1 in common are connected at the output side to the coupling capacitors C1 or, respectively, C2 by way of respective dropping resistors R3 and R4.

As shall yet be set forth, the two analog switches S11 and S12 are closed at the beginning of a switch-over event and charge the coupling capacitors to the new value. A decoupling from the input side by the two separator transistors TR1 or, respectively, TR2 occurs at this time, so that the charging of the coupling capacitors C1 or, respectively, C2 does not occur via the collector current of the amplifier circuit 5 which is switched on but, rather, occurs via the line path closed by the analog switches S11 and S12.

A respective further analog switch S21 or, respectively S22 is serially connected following the coupling capacitor C1 or, respectively, C2 in the line ranges for the two sub-signals LS'P or, respectively, LS'N of the preamplified read signal LS'. As shall likewise yet be set forth, these second analog switches are opened during a switch-over operation and are not closed until, after the charging of the coupling capacitor C1 or, respectively, C2 has been carried out, the first analog switches S11 and S12 are opened. At the output side, the second analog switches respectively lie at positive operating voltage via further load resistors R7 or, respectively, R8. The respective junctions of the load resistors R7 and R8 with the assigned outputs of the second analog switches S21 and S22 form the signal outputs for the transient circuit which emit the in-coupled sub-signals LS'P and LS'N to corresponding inputs of a controllable read output signal amplifier of the signal editing device 6 in a known manner.

The switching times of the two pairs of analog switches S11, S12 and S21, S22 are then defined with the status control signal RD/WR which defines the operating states "write" and "read", the status control signal being output by the device control 4 and being supplied to the amplifier circuits 5 and to the signal editing device 6. This control signal is a static signal which defines the read state given a high level and defines the write state given a low level.

The status control signal RD/WR is supplied to a switching network shown in FIG. 2 whose outputs are connected to the control input of the two pairs of analog switches S11, S12 and S21, S22. A first operational amplifier DA1 is provided in this switching network, the non-inverting input thereof being connected to the junction of a voltage divider constructed of two divider resistors R9 and, respectively, R10 which are connected between the voltage UB1 and ground. The inverting input of the operational amplifier DA1 is referenced with a circuit point A. The circuit point A, first of all, is connected via a dropping resistor R11 to the voltage UB1 and, secondly, is connected to the output of a switching matrix network having two parallel line branches which is connected in common to the input of the switching matrix network. The status control signal is supplied to this input. A first switching diode D1 is arranged in one of the line branches such that its anode is connected to the circuit point A. In addition, a further diode D2, polarized in the same manner is provided in the second branch and is connected to the input via an RC timing element comprising a further resistor R12 and a further capacitor C3 which is also connected to ground.

The output of the first operational amplifier DA1 is connected via a first holding resistor R13 to a second positive operating voltage UB2 which, for example, can amount to +12 V. This output, referenced as a circuit point B in FIG. 2, is connected in parallel to the control inputs of the first pair of analog switches S11, S12 and is also connected to the inverting input of a second operational amplifier DA2 whose non-inverting input is again connected to the junction of the voltage divider formed by the resistors R9 and R10. The output of the second operational amplifier is referenced as a circuit point C and is, analogous to the first operational amplifier, applied via a further holding resistor R14 to the voltage UB2 and, analogously, is connected to the control inputs of the second pair of analog switches S21 and S22.

The function of the switching network which evaluates the status control signal RD/WR shall be set forth in greater detail below with reference to the graphic illustration of the signals illustrated in FIG. 3. A possible signal shape of the status control signal RD/WR is shown in the first line in FIG. 3, a negative going pulse edge appearing therein at the time t1 and defining a switch-over of the disk memory from the read state into the write state.

The first switching diode D1 is rendered conductive with this negative edge of the status control signal RD/WR so that a lower level is likewise immediately set without a time delay at the circuit point A. A correspondingly high signal level is established at the circuit point B, the output of the first operational amplifier, as may be seen from the signal curve at the circuit point B shown in the third line of FIG. 3.

The first pair of analog switches S11, S12 is closed with the high signal level, so that the coupling capacitor C1, C2 are quickly recharged. Moreover, the high level at the circuit point B which is connected to the inverting input of the second operational amplifier DA2 immediately effects a reversing of this operational amplifier, as may be seen from the pulse diagram shown in the fourth line of FIG. 3 which reflects the signal state at the circuit point C. The negative signal edge appearing at the circuit point C at the time t1 causes the second pair of analog switches S21, S22, which was closed in the preceding read operation, to now be opened. During the following write operation, therefore, both outputs for the sub-signals LS'P and LS'N of the preamplified read output signal lie at high signal levels; this effects that the following, controllable read output signal amplifier (not shown) is selected.

Figure 3:
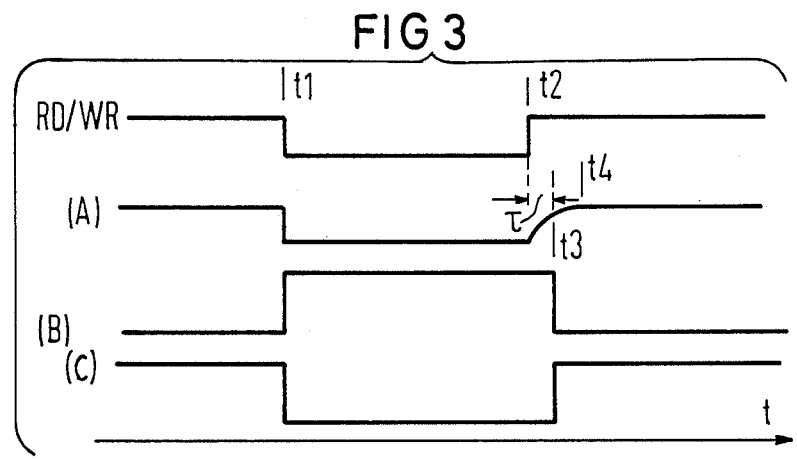
FIG. 3 consisting of A through C is a graphic illustration including a series of pulse diagrams for explaining the operation of the input stage of the signal shaping device.

In accordance with the illustration of FIG. 3, the disk memory should again change in operating mode at the time t2, i.e. should change from the state "write" into the state "read". In this case, however, the positive signal edge of the status control signal RD/WR does not become effective at the circuit point A until delayed by a time interval $\tau$ due to the effect of the RC timing element R12, C3. Given this exponential signal curve, the threshold for the first operational amplifier DA1 is reached at the end of this time interval, i.e. at the time t3, so that the signal state at the output thereof, the circuit point B, changes in the manner of a pulse at this time. The low signal level being thereby established immediately effects the opening of the first pair of analog switches S11, S12 and, correspondingly, effects the closing of the second pair of analog switches S21, S22 due to the switch behavior of the second operational amplifier DA2.

It is therefore clear that the R timing elements R12, C3 which precedes the second switching diode D2 defines that delay interval $\tau$ during which the first pair of analog switches S11, S12 is still closed during the reversing operation and quickly charges the two coupling capacitors C1, C2.

When a realistic embodiment of the disk memory is referred to, then one can assume a read signal period averaging less than 1 $\mu$s. In order to avoid distortions in the read output signal and in order to also obtain a certain stability of a controllable read output signal amplifier of the signal editing device 6 connected to the transient circuit, time constants which lie on the order of 30–50 $\mu$s must then be established in this processing structure. By contrast, the effective transient response for the read output signal in a switching of the operating state of the disk memory should lie significantly lower. In the example, this could be a value of about 10 $\mu$s. About half of this time would then be available for the delay interval $\tau$ an the RC timing element R12, C3 is to be accordingly dimensioned.

A further point of view which occurs from the switching of the two pair of analog switches is also to be taken into consideration. The load at the coupling capacitor C1, C2 changes due to the switching, a disturbing difference signal which is also dependent on phase relations of the useful signal deriving therefrom, which difference signal would devalue the effect achieved with the assistance of the analog switches. This can be governed by the number of measures. When, first of all, in the assumed example, the RC element R12, C3 is effective with respect to the status control signal RD/WR causes an effective delay time of about 5 $\mu$s, then the timing element formed of a coupling capacitor C1, or, respectively, one of the first analog switches S11 or, respectively, S12 and of the assigned dropping resistor R3 or, respectively, R4 is to be dimensioned such that its time constant lies, for example, in the region of 2 $\mu$s. In this case, the disturbance effected by the connection of an output stage in one of the amplifier circuits 5 has already decayed before the analog switches are switched over. The charging resistors R7, R8 are dimensioned higher with reference to the dropping resistors R3, R4 so that a higher time constant occurs in the through-connected condition, i.e. in the read state, in conjunction with the respectively assigned coupling capacitor, this higher time constant particularly serving the stability of the following circuit arrangement. However, the values of resistance of the charging resistors R7, R8 should not differ from those of the dropping resistors R3, R4 by more than one order of magnitude so that this difference signal has less than an influence at the outputs of the transient circuit given curren transfer.

The invention has been set forth in detail above with reference to an exemplary embodiment without specifically limiting the invention thereto. It was assumed, for example, in the described exemplary embodiment that the output stage for the read output signal in the amplifier circuits is designed as an "open collector" circuit. This, however, is not a compulsory condition. This output stage can also be an emitter follower. Noise voltages upon connection, or, respectively, disconnection of the output stage would also then derive and would lead to excessively long transient responses without countermeasures. The described exemplary embodiment is also based on a magnetic disk memory. In addition, however, the present invention can also always be employed in other types of storage, for example, magneto-optical or optical memories when a plurality of read or, respectively, write/read heads with integrated amplifier circuits is connected to a common signal editing device and these read or, respectively, write/read devices are selective activated.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for shaping an analog read output signal in a rotating mass memory which has a plurality of rotating storage disks and a plurality of read/write heads each assigned to the storage disks and a plurality of selectively activatable preamplifiers each connected to a respective head, said circuit arrangement comprising:

a signal shaping device including an input stage connected to each of said preamplifiers for receiving the read signal of an activated preamplifier, said input stage including a pair of outputs;

a pair of output lines;

a pair of coupling capacitors respectively connecting said outputs of said input stage to said output lines;

a pair of first analog switches each connected between an operating voltage and a respective coupling capacitor;

a pair of second analog switches each serially connected in a respective output line; and control means including first and second outputs respectively connected to said first and second analog switches and an input for receiving a static read/write status signal, said control means responsive to change of the read/write status signal to briefly close said first analog switches and cause rapid recharging of said coupling capacitors and to subsequently close said second analog switches and through-connect said pair of output lines.

2. The circuit arrangement of claim 1, wherein said input stage further comprises:

first and second separating transistors each connected between a respective coupling capacitor and the preamplifiers to prevent charging of said coupling capacitors from an activated preamplifier, each of said separating transistors including an emitter connected to a respective coupling capacitor; and a pair of emitter resistors connecting the respective emitters to ground.

3. The circuit arrangement of claim 1, wherein said arrangement further comprises:

a pair of first load resistors connecting said pair of first analog switches to the respective coupling capacitors; and a pair of second load resistors connecting the outputs of said second analog switches to the operating potential, the value of said second load resistors being higher than that of said first load resistors.

4. The circuit arrangement of claim 1, in combination with said preamplifiers constructed as open collector amplifiers, and further comprising:

a pair of collector resistors connecting respective collectors to the operating voltage.

5. The circuit arrangement of claim 1, wherein said control means comprises:

first and second operational amplifiers each including an inverting input, a non-inverting input and an output;

said noninverting inputs connected to a reference potential;

said output of said first operational amplifier connected to said inverting input of said second operational amplifier and to said first and second analog switches;

said output of said second operational amplifier connected to said second analog switches;

a pair of load resistors connecting said outputs of said first and second operational amplifiers to a further operating potential; and an input network connecting said input of said control means to said inverting input of said first operational amplifier for receiving the read/write status signal.

6. The circuit arrangement of claim 5, and further comprising:

a dropping resistor connected between the operating voltage and said inverting input of said first operational amplifier; and a pair of signal branches in said input network connected between said input of said control means and said inverting input of said first operational amplifier, a first of said branches including a first switching diode and the second of said branches including a further resistor and a second switching diode connected in series and a further capacitor connected between the junction of said further resistor and second switching diode and ground.

7. The circuit arrangement of claim 1, wherein the preamplifiers are symmetrical amplifiers which generate a differential signal as the preamplified read output signal, the differential signal being composed of two mutually inverse subsignals, and wherein:

said input stage includes separate branches for receiving said subsignals, said branches coupled to said pair of first analog switches and said pair of analog switches via said coupling capacitors.

* * * * *